July 1, 1969 M. SARAYDAR 3,452,952
HOLDER FOR HOSE ENDS

Filed April 14, 1967 Sheet 1 of 2

INVENTOR.
MICHAEL SARAYDAR
BY Richards & Geier
ATTORNEYS

July 1, 1969 M. SARAYDAR 3,452,952
HOLDER FOR HOSE ENDS

Filed April 14, 1967 Sheet 2 of 2

INVENTOR.
MICHAEL SARAYDAR
BY Richards & Geier
ATTORNEYS

# United States Patent Office 3,452,952
Patented July 1, 1969

3,452,952
HOLDER FOR HOSE ENDS
Michael Saraydar, 1972 53rd St., Brooklyn, N.Y. 11204
Filed Apr. 14, 1967, Ser. No. 630,923
Int. Cl. F16l 33/00; B05b 15/06
U.S. Cl. 248—75                              1 Claim

ABSTRACT OF THE DISCLOSURE

A holder has a lower holding end and an upper end receiving the end of a hose. The lower end supports a nipple which receives the hose. The device is made of a continuous piece of wire, the ends of which terminate in a pair of opposed clamping hooks.

---

This invention relates to a holder for hose ends.

There are many instances when a hose carrying water or some other liquid must be inserted into an inlet of a drain in order that the liquid should pour into the drain or be fixed to a support. Often the liquid flowing through the hose causes the hose end to swing so that the liquid flows past the required location. This swinging of the hose end can also result from many other exterior circumstances.

An object of the present invention is to avoid this danger and to provide means which will securely guide the end of a liquid-carrying hose, pipe or the like.

Other objects of the present invention will become apparent in the course of the following specification.

In the acomplishment of the objectives of the present invention it was found advisable to provide an attachment for hose ends which consists of a single piece having a lower end which is adapted to clamp or engage the insert of the drain or some other support. The upper integral part of the attachment may have the shape of a sleeve or a helical or spiral coil adapted to receive and to hold the end of the hose, pipe or other liquid-carrying tubular element. The upper end of the holder may contain a tubular insert the purpose of which is to provide a better connection for the end of the hose.

The invention will appear more clearly from the following detailed description when taken in connection with the accompanying drawing, showing by way of example, preferred embodiments of the inventive idea.

Figure 1:
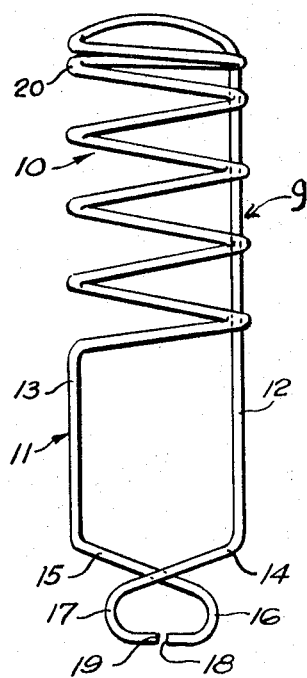
FIGURE 1 is a side view showing the holder of the present invention.
Figure 2:
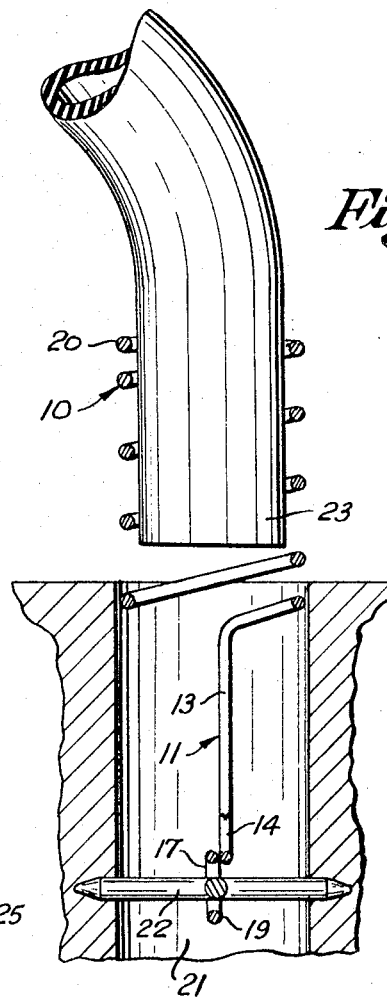
FIGURE 2 is a sectional view showing the same holder when it is attached to a drain pin.
Figure 3:
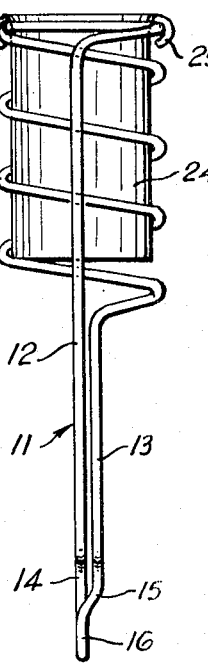
FIGURE 3 is a different side view of the holder provided with a tubular end portion for the end of a hose.

The holder 9 shown in FIGS. 1 to 3 is made of spring wire and has an upper hose-engaging portion 10 and a lower drain-fitting portion 11. The holder has two parallel arms 12 and 13 with lower sections 14 and 15 which cross each other to form an X. These sections continue as rounded portions 16 and 17 which are curved in opposite directions and which terminate in legs 18 and 19. The legs 18 and 19 are normally pressed against each other due to the resiliency of the spring wire of which the holder is made.

The arm 12 extends upwardly to the top of the holder and then continues as a downwardly extending helical coil 20 the lower end of which is integral with the top of the arm 13. The coil 20 is used to receive the end of the hose.

As shown in FIG. 2, in use the lower portion 11 of the holder is inserted into the drain hole 21 and the portions 16 and 17 of the holder are placed around the cross-shaped pin 22 with which most drain holes are provided and which is usually located close to the top of the drain hole. The end of the hose 23 is inserted into the coil 20 of the holder.

It is apparent that the holder of the present invention will hold firmly the end of the hose 23 while its contents are poured into the drain 21. The hose can either fit inside the coil 20 or it can be stretched over the coil 20.

FIG. 3 shows the same holder which is provided, however, with a sleeve 24 located within the coil 20 and attached thereto by clamps 25. It is apparent that the inner diameter of the sleeve 24 may be made substantially the same or only slightly larger than the outer diameter of the hose 23, so that the end of the hose will be held tightly within the sleeve, thereby preventing any possibility that the hose may be unintentionally withdrawn from the holder and that water may be spilled.

Figure 4:
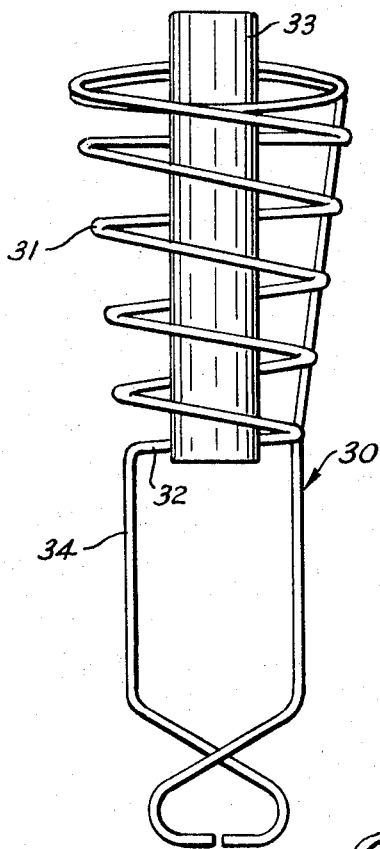
FIGURE 4 is a side view showing a differently constructed holder.

FIG. 4 shows a holder 30 having an upper hose-engaging portion 31 which consists of a conical outwardly widening coil. The lower end 32 of the coil 31 carries a central piece or nipple 33 which can be welded thereto. The lower clamping portion 34 of the holder 30 is the same as that of the holder 9 shown in FIGS. 1–3. The advantage of the conical shape of the coil 31 is that the coil can be readily used with hose ends of different diameters and with drain holes of different sizes. In the case of a drain hole of larger size than the average, a larger portion of the coil will extend into the drain hole. The central piece 33 provides a conventional support for the end of the hose extending into the coil 31.

Figure 5:
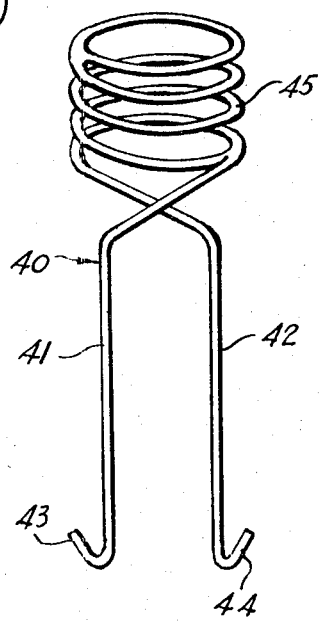
FIGURE 5 is a perspective view illustrating another holder.

FIG. 5 shows a holder 40 which is not made of resilient wire as the previously described holders, but of a rigid material, preferably plastic. The holder 40 has two parallel legs 41 and 42 terminating in hooks 43 and 44 which extend in opposite directions. The upper portion of the holder 40 consists of a number of rings 45, the central axis of the rings extending parallel to the legs 41 and 42. This holder is suitable not only for engagement in drain holes but also for supporting the end of a hose which is directed upwardly; for example, the holder 40 may be attached to a fence or any other support to hold the end of a hose upwardly, so that water emerging from the hose may be spread over a predetermined ground area.

Figure 6:
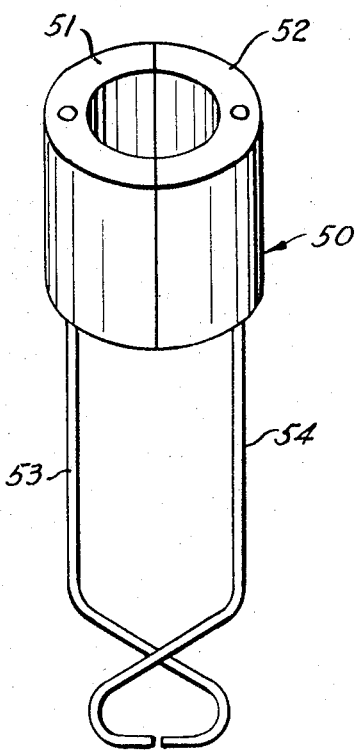
FIGURE 6 is a perspective view showing yet another holder construction.

FIG. 6 shows a holder 50 which has an upper portion composed of two halves 51 and 52 which may be made of rubber, plastic or any other suitable material. The two halves interfit to form a sleeve which may hold the end of a hose. The hose may fit over the sleeve 51, 52 or it may be inserted inside the sleeve. The sleeve portion 51 holds firmly the leg 53 which is embedded therein. A leg 54 is embedded in the sleeve portion 52. The legs 53 and 54 are of the same shape as the legs of holders shown in FIGS. 1, 2, 3 and 4. In use, the sleeve 51, 52 may be pressed into a drain hole with the ends of the legs 53 and 54 engaging a transverse pin in the drain.

The hose end is then fitted inside the sleeve. The use of the sleeve in this manner prevents any possibility of contact between the walls of the drain and the hose.

It is apparent that the examples described above have been given only by way of illustration and not by way of limitation and that they are subject to many variations and modifications within the scope of the present invention. All such variations and modifications are to be included within the scope of the present invention.

What is claimed is:

1. A holder for hose ends, comprising in combination an upper hose-engaging portion consisting of a conical coil widening toward its upper end and a lower clamping portions comprising two parallel legs constituting continuations of the upper and lower ends of said coil, said legs having lower inclined portions extending toward and crossing each other, said inclined portions terminating in hooks extending in directions opposite to that of their inclined portions, said hooks facing each other, the central axis of said coil extending between the ends of said hooks, and a nipple fixed to the lower end of said coil.

References Cited

UNITED STATES PATENTS

| | | | |
|---|---|---|---|
| 868,004 | 10/1907 | Post | 24—261.3 X |
| 805,579 | 11/1905 | Patchen | 248—75 X |
| 1,599,251 | 9/1926 | Short | 248—43 X |
| 1,626,333 | 4/1927 | Fain | 248—38 |
| 2,284,004 | 5/1942 | McCurdy | 24—261.3 X |
| 2,414,358 | 1/1947 | Calway | 248—38 |
| 2,494,476 | 1/1950 | Goetter | 248—216 X |
| 2,861,527 | 11/1958 | Phillips | 248—75 X |
| 3,033,502 | 5/1962 | Silver | 248—38 |

CHANCELLOR E. HARRIS, *Primary Examiner.*

U.S. Cl. X.R.

248—227